(12) United States Patent
Cowling et al.

(10) Patent No.: US 11,304,402 B2
(45) Date of Patent: *Apr. 19, 2022

(54) MILKING ARRANGEMENT AND A METHOD OF MILKING ANIMALS THEREIN

(71) Applicant: DELAVAL HOLDING AB, Tumba (SE)

(72) Inventors: Tony Cowling, Tumba (SE); Doug Eubank, Tumba (SE); Jeffery Gallagher, Tumba (SE); Bengt-Göran Mårtensson, Tumba (SE); Scott Pawlowicz, Tumba (SE); Patrick Wiltzius, Tumba (SE); Stuart Wipperfurth, Tumba (SE)

(73) Assignee: DeLaval Holding AB, Tumba (SE)

( * ) Notice: Subject to any disclaimer, the term of this patent is extended or adjusted under 35 U.S.C. 154(b) by 78 days.

This patent is subject to a terminal disclaimer.

(21) Appl. No.: 16/638,256

(22) PCT Filed: Oct. 1, 2018

(86) PCT No.: PCT/SE2018/051006
§ 371 (c)(1),
(2) Date: Feb. 11, 2020

(87) PCT Pub. No.: WO2019/070185
PCT Pub. Date: Apr. 11, 2019

(65) Prior Publication Data
US 2020/0163307 A1      May 28, 2020

(30) Foreign Application Priority Data
Oct. 3, 2017   (SE) .................................. 1751218-7

(51) Int. Cl.
*A01K 1/12*     (2006.01)
*E05F 15/70*    (2015.01)
(Continued)

(52) U.S. Cl.
CPC .................. *A01K 1/12* (2013.01); *A01J 5/007* (2013.01); *A01K 1/0029* (2013.01); *E05F 15/70* (2015.01); *E05F 17/00* (2013.01)

(58) Field of Classification Search
CPC .......... A01K 1/12; A01K 1/0029; A01J 5/007
See application file for complete search history.

(56) References Cited

U.S. PATENT DOCUMENTS 5,259,335 A     11/1993   Moreau
5,392,731 A *    2/1995   Hoppman ................ A01K 1/12
                                                        119/14.03
(Continued)

FOREIGN PATENT DOCUMENTS

EP    0119759 A1 *   9/1984   ............... A01K 1/12
EP    1129616 A2     9/2001
(Continued)

OTHER PUBLICATIONS

SE Search Report, dated Apr. 26, 2018, from corresponding SE application No. 1751218-7.
(Continued)

*Primary Examiner* — Magdalena Topolski
(74) *Attorney, Agent, or Firm* — Nixon & Vanderhye

(57) ABSTRACT

A milking arrangement includes a milking module having at least two milking places, a front gate assembly, a sequence gate assembly, an entrance gate, an independent first drive device for moving the front gate assembly between lower and upper positions, and a second drive device for moving the entrance gate between open and closed positions. An independent third drive device moves the sequence gate assembly from a first position to a second elevated position in which the sequence gates are located at a level above and behind animals standing in respective milking places. The sequence gate assembly being configured to move from the second position to the first position such that the sequence
(Continued)

gates urge animals standing in their respective milking places to leave the milking places. A control arrangement controls opening of the entrance gate on basis of the position of the sequence gate assembly.

17 Claims, 11 Drawing Sheets

(51) Int. Cl.
*A01J 5/007* (2006.01)
*E05F 17/00* (2006.01)
*A01K 1/00* (2006.01)

(56) References Cited

U.S. PATENT DOCUMENTS

| | | | |
|---|---|---|---|
| 5,615,637 A | 4/1997 | Nelson | |
| 7,644,681 B2 | 1/2010 | Moreau | |
| 10,980,213 B2 * | 4/2021 | Gallagher | A01J 5/007 |
| 2001/0042515 A1 | 11/2001 | Gallagher et al. | |
| 2015/0201587 A1 | 7/2015 | Brayer et al. | |
| 2021/0144957 A1 * | 5/2021 | Cowling | E05F 15/70 |

FOREIGN PATENT DOCUMENTS

| | | |
|---|---|---|
| WO | 2008/003341 A1 | 1/2008 |
| WO | WO-2019022594 A1 * 1/2019 | ............. A01K 29/00 |

OTHER PUBLICATIONS

International Search Report and Written Opinion, dated Jan. 3, 2019, from corresponding PCT application No. PCT/SE2018/051006.

* cited by examiner

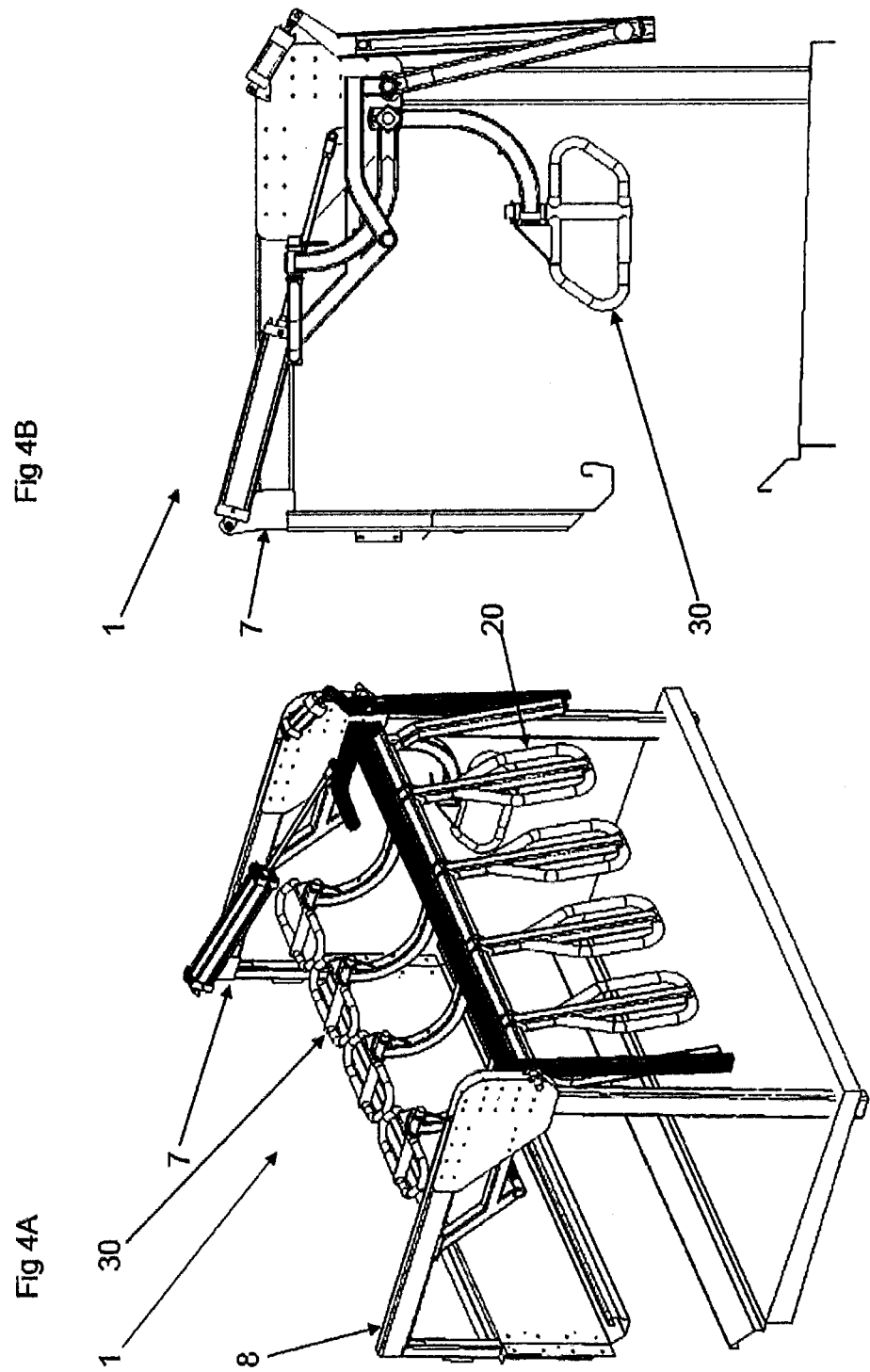

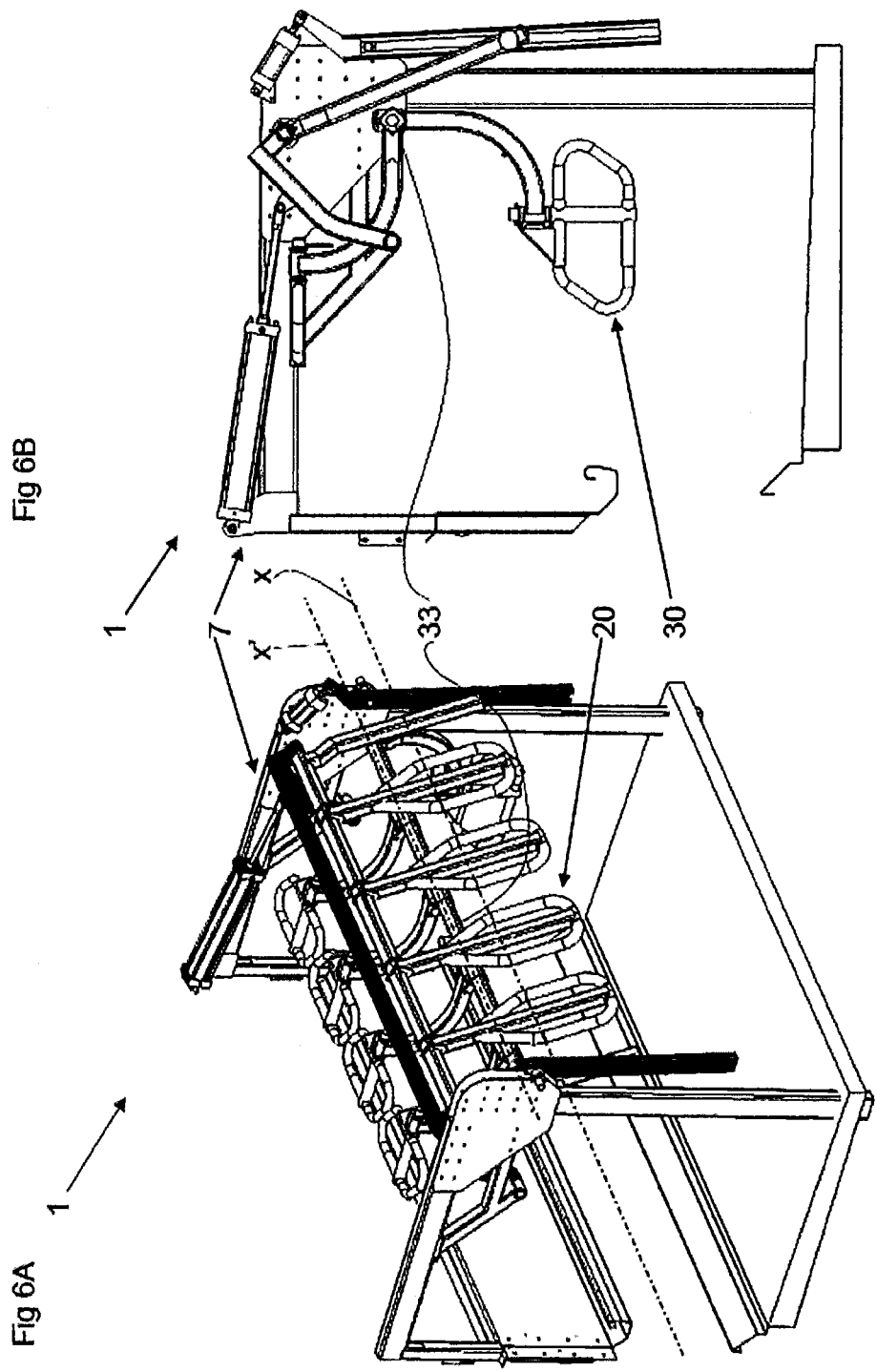

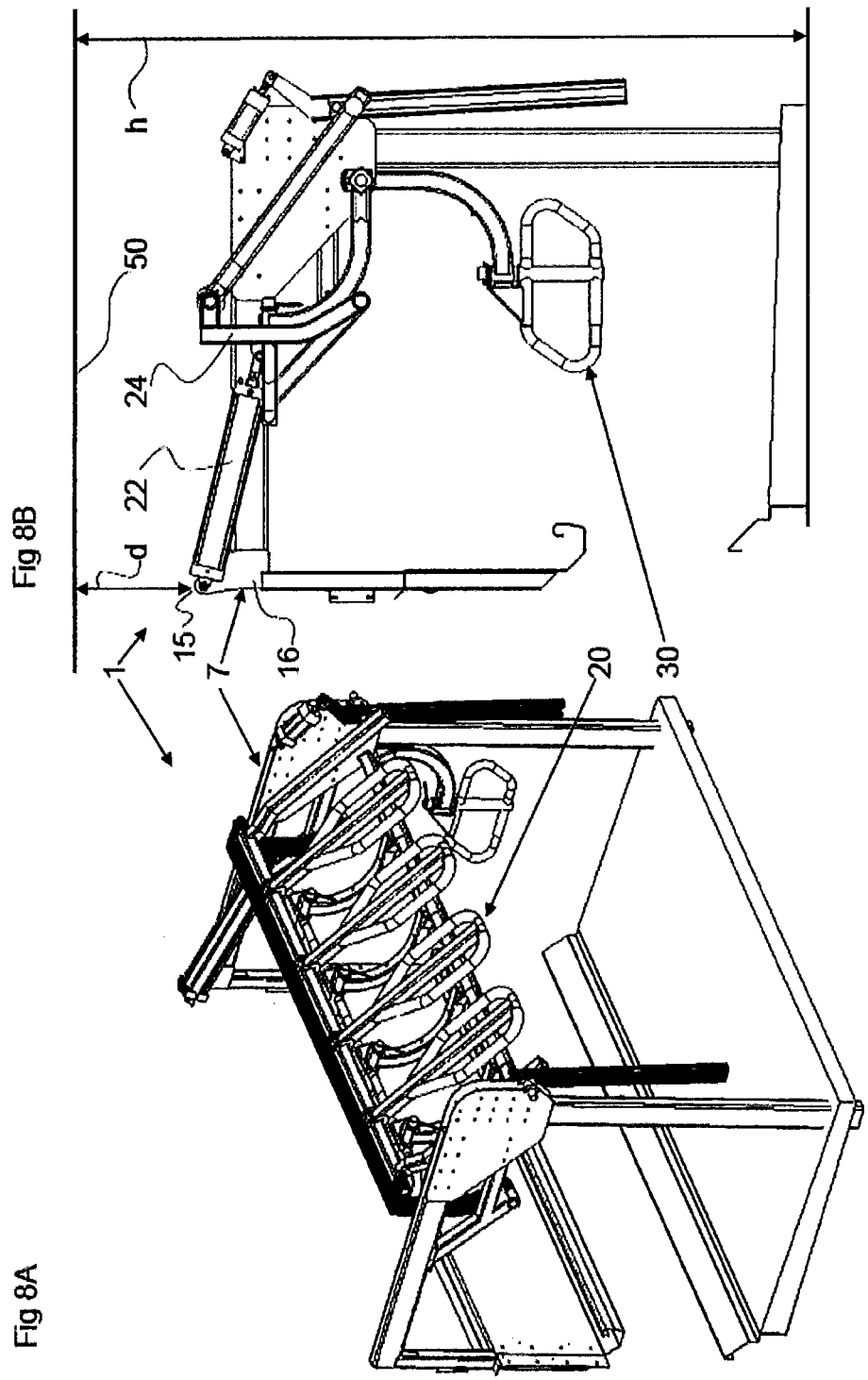

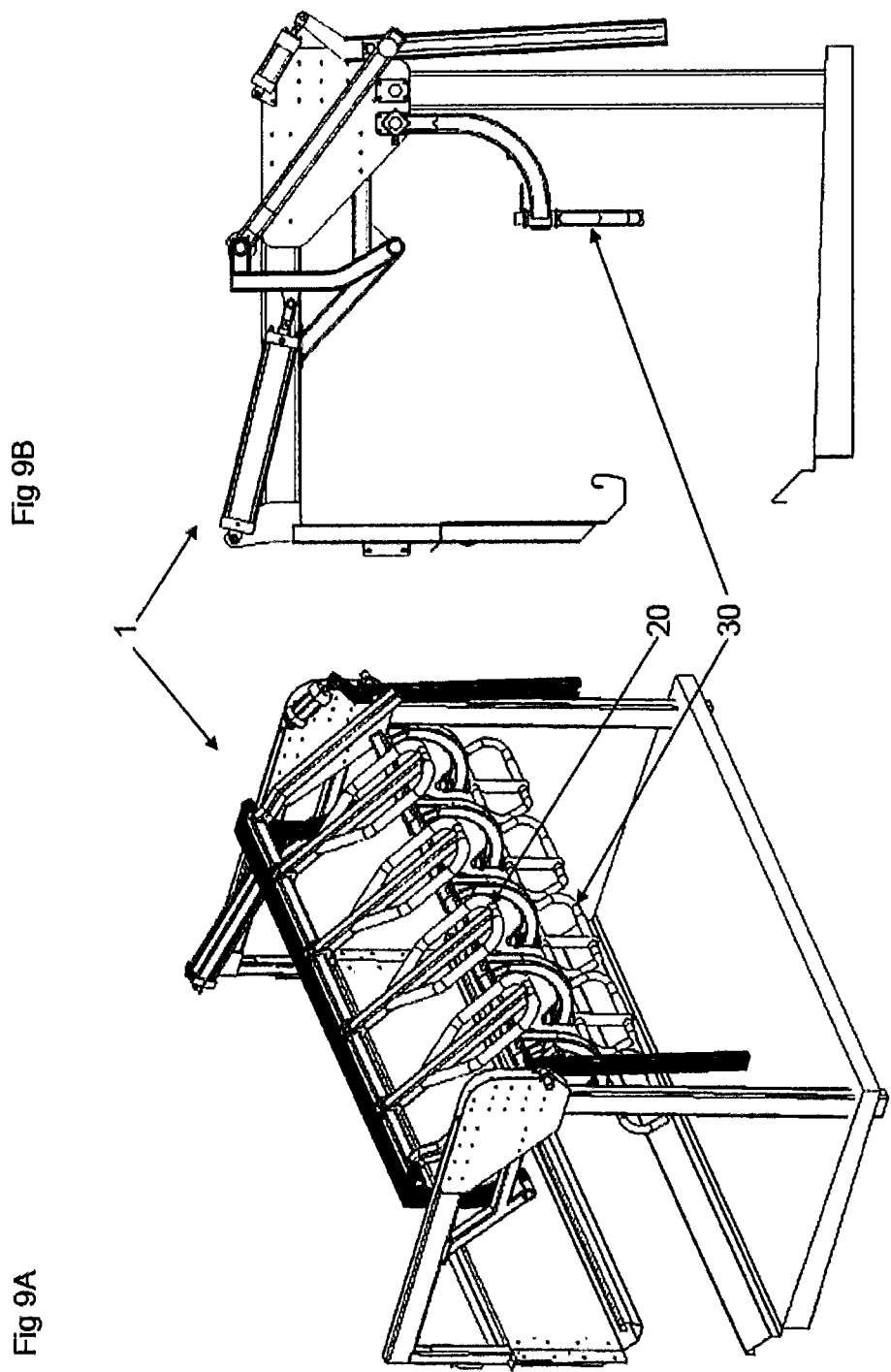

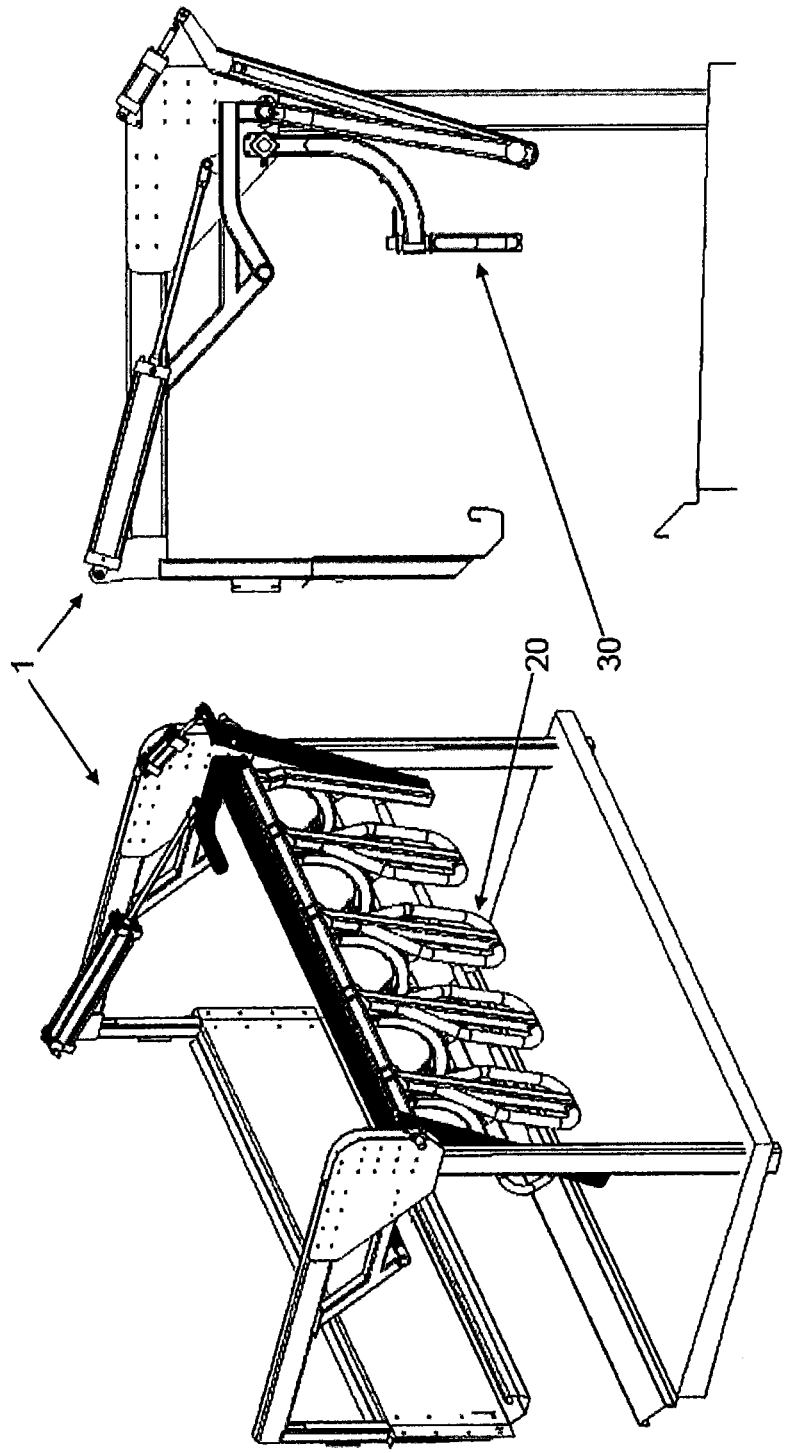

MILKING ARRANGEMENT AND A METHOD OF MILKING ANIMALS THEREIN

TECHNICAL FIELD

The present invention relates to a milking arrangement comprising at least one milking module comprising
- at least two milking places arranged side by side after each other along a longitudinal axis (x), each milking place being configured to receive a respective animal to be milked,
- a primary end and a secondary end opposite to the primary end, wherein the milking arrangement extends along the longitudinal axis (x) from the primary end (1') to the secondary end,
- a front side and a rear side, which both extend in parallel with the longitudinal axis (x),
- a front gate assembly movable between a lower position in which it closes the front side to prevent the animals from leaving the respective milking place through the front side, and an upper position, configured to permit the animals to leave the respective milking place through the front side,
- a sequence gate assembly comprising at least two sequence gates provided between said front side and said rear side, wherein each of said sequence gates, in a first positon of the sequence gate assembly, is pivotable between a closed position, in which the sequence gate defines a barrier against entrance into a milking place, and an open position in which it forms a side wall of the milking place,
- an entrance gate provided in the primary end of the of the milking module, said entrance gate being movable between a closed position in which it prevents animals from entering said at least one milking module and an open position in which it allows animals to enter the milking module through the primary end,
- wherein the milking arrangement comprises an independent first drive device for moving the front gate assembly between its lower and upper positions and a second drive device for moving the entrance gate between its open and closed positions.

The present invention also relates to a method of milking a group of at least two animals in a milking arrangement according the present invention.

BACKGROUND ART

Milking arrangements as defined hereinabove for the milking of cows are often used in parallel pairs, separated by a pit in which an operator is able of moving along the respective milking arrangement. These arrangements may also be referred to as double row parlours. The parallel milking arrangements have their rear sides turned towards each other, and one of the tasks of the operator is to attach milking apparatuses to the animals from behind while standing in the pit as the animals stand in their respective milking places with their heads turned towards the front side of the respective milking arrangement and their rear ends turned towards the pit. Milking in the milking arrangements normally follows a scheme according to which one group of animals enter one of the arrangements while animals are being milked in the other arrangement, such that the operator can work with one milking arrangement at a time.

When animals enter the module or modules of a milking arrangement through an entrance opening provided at the primary end of the arrangement they will move in the direction of the longitudinal axis of the arrangement along a path defined between the closed sequence gates and the rear side of the arrangement. The path has a width which is large enough to permit one animal to pass through it, but which is narrow enough to prevent animals from walking side by side through it. The first animal to enter the path will walk down the path until it reaches the opposite secondary end thereof. Once there, the animal will turn towards the last sequence gate of the arrangement and will push it such that it pivots from its closed position to its open position, whereupon the animal enters a milking place by stepping further forward to the front side of the milking arrangement. The front gate, being in its lower position, will prevent the animal from leaving the milking place through the front side at this stage. The next animal will walk into the neighbouring upstream milking place by pushing and thereby pivoting the sequence gate of that milking place from its closed position to its open position. As the animals fill up the remaining milking places of the milking arrangement, the operator may work his or her way from the secondary end to the primary end of the milking arrangement, attaching milking apparatuses to the animals that have recently entered their respective milking places. Alternatively, the operator may wait until all animals have entered their milking places before he or she starts applying the milking apparatuses.

When milking of the animals in a milking arrangement has been finished the front gate is opened and the animals are able to leave the milking arrangement through the front side thereof. In order to ensure that the animals do leave their milking places, there may be provided devices by means of which the animals are urged to leave their milking places. One such device is presented in U.S. Pat. No. 7,644,681, wherein the device for urging the animals to leave their milking places is a push bar arranged on extendible support members which are moved by means of air cylinders arranged at a support structure above the milking places.

The object of the present invention is to present an alternative milking arrangement design which comprises a device for urging animals to leave their milking place through the front side of the module or modules of the milking arrangement.

It is also an object of the invention to present an alternative milking arrangement which has a design that is space-saving compared to corresponding prior art designs.

SUMMARY OF THE INVENTION

The object of the invention is achieved by means of a milking arrangement as defined hereinabove and in the preamble of claim 1, characterized in that it comprises an independent third drive device for moving the sequence gate assembly from said first position to a second position, which is an elevated position in which the sequence gates are located at a level above and behind animals standing in the respective milking places, and that the sequence gate assembly is configured to move from said second position to the first position with its sequence gates in their closed position such that the sequence gates urge animals standing in their respective milking places to move towards the front side and to leave the milking places through the front side, and that the milking arrangement comprises a control arrangement which is configured to control the opening of the entrance gate on basis of the position of the sequence gate assembly.

In other words, the invention uses the idea of letting the sequence gates having a double function, namely that of a sequence gate for animals entering their milking places and that of a device for urging the animals to leave the milking places after finished milking. No further assembly, arranged merely for urging purposes, is required. The inventive idea of having the sequence gate assembly movable between the first position and the second, elevated, position is also that it will enable removal of the sequence gates from the area between the animals during the milking of the animals, thereby giving more space to the animals and improving their feel of comfort, which is not an unimportant issue.

Preferably, each sequence gate is biased such that its default position is the closed position. In said first position of the sequence gate assembly, when the sequence gates are in their closed positions, the sequence gates will give the animals an impression of a wall as the animals walk from the primary end towards the secondary end along a path defined between the sequence gates and the rear side of the module or modules. If a force is applied to the sequence gate such that it pivots to the open position, the sequence gate will return to the closed position as soon as the force is removed. The open position may be a metastable position, such that a small counterforce may be needed in order to actually make the sequence gate return to the closed position. Such metastability may be achieved by a snap arrangement or the like, whereby just a small counterforce, will loosen sequence gate from a snapping engagement that it is subjected to in its open position and make it return the closed position.

The sequence gate design may be more or less complicated. According to a relatively uncomplicated embodiment, a sequence gate is defined by a bar extending from a supporting structure such as an arm. However, the sequence gate may also be of a more gate-like, grid-like or door-like design. It may be more or less invisible in order to give more or less impression of a wall to the animals. Preferably, each sequence gate is pivotable around an arm which in its turn is connected to a bar that extends above the milking places in the direction of the longitudinal axis of the milking arrangement. Either said bar is rotatable around its axis or is said arm pivotable in relation to said bar in order to enable the sequence gate assembly to move between its first and second positions. In the first position of the sequence gate assembly, said arm extends generally vertically from said bar. In the second position of the sequence gate assembly, said arm may extend with an angle in the range of 45°-90° in relation to a horizontal plane. Said bar should be arranged at level above the expected maximum height of the animals to be milked in the milking arrangement.

The first, second and third drive devices may comprise any device suitable for the purpose of moving the respective assemblies and gates. For example the drive devices may comprises cylinder-piston units driven by pressurized gas or liquids, or electric engines.

The control arrangement which is configured to control the opening of the entrance gate on basis of the position of the sequence gate assembly may comprise any kind of suitable logic, such as a relays mechanism, or a soft-ware-based control mechanism that controls the second drive device on basis of a signal indicative to the fact that the sequence gate has reached a predetermined position. Preferably, the control arrangement is configured to control the second drive device to move the entrance gate from its closed position to its open position as a response to an signal indicative to the fact that the sequence gate assembly has moved from the second position to the first position, which is also indicative to the fact that the animals have left the module or modules of the milking arrangement through the front side. A rapid and automatic opening of the entrance gate, as soon as a group of animals that have been milked have left the milking modules through the front side, ensures a high and reliable flow of animals through the arrangement, and that the operator does not have to do the opening manually, but instead can be focused on working with other things, such as attaching milking apparatuses onto animals to be milked in a parallel milking arrangement.

According to one embodiment, the milking arrangement comprises a control unit which is configured to control the operation of the entrance gate, the front gate assembly and the sequence gate assembly by controlling the operation of the first, second and third drive devices. Thereby, the control unit may use software that brings great functional versatility to the milking arrangement, compared to a case in which the different drive devices would be relays-controlled. Detectors of different kinds may be arranged for providing data input on basis of which the control unit will be configured to take different steps.

According to one embodiment, the milking arrangement comprises a user interface by means of which a user is able of controlling the operation of at least one of the first, second and third drive devices. Preferably the interface is configured to enable a user to control the operation of each of the first, second and third drive devices. Preferably, the user interface enables a user to overrule the logic of a control unit, such that an operator can interfere with the software-dictated control of the first, second and third drive devices, in case an operator find it necessary to do so.

According to one embodiment, the milking arrangement comprises a detector configured to provide the control unit with information indicative to the fact that the animals have reached their respective milking place and wherein the control unit is configured to control the third drive device to move the sequence gate assembly from its first position to its second position after receiving said information from said detector. The detector may be a camera or the like, but may also comprise the milking apparatuses, whereby the starting of milking of all animals that that have entered the modules may be used as an indication that all animals have reached their respective milking places. The detector may also comprise an animal-counting device, preferably arranged at the entrance gate, wherein said animal-counting device counts how many animals that have entered the milking module or modules of the milking arrangement. By moving the sequence gate assembly to the second position at an early stage of the milking of the animals, more space is given to the animals in a lateral direction during the milking period, adding to an improved comfort for the animals.

According to one embodiment, the milking arrangement comprises a detector configured to provide the control unit with information indicative to the fact that the milking of the animals has been finished, and the control unit is configured to control the first drive device to move the front gate assembly from its lower position to its upper position and to control the third drive device to move the sequence gate assembly from its second position to its first position after receiving said information from said detector. The detector may, for example, comprise a milk meter connected to the milking apparatus that is used for milking the animals, that registers that the milking has ended.

According to one embodiment, the milking arrangement comprises a detector configured to provide the control unit with information indicative to the fact that the animals have entered said module, and that the control unit is configured to control the second drive device to move the entrance gate from its open position to its closed position after receiving said information from said detector. As mentioned hereinabove, such a detector may comprise an animal-counting device that counts the number of animals passing the open entrance gate, wherein the control unit controls the second drive device to close the entrance gate when a predetermined number of animals have passed through the entrance gate.

According to one embodiment, the control unit is configured to control the second drive device to move the entrance gate from its closed position to its open position as a response to the sequence gate assembly having been moved from its second position to its first position.

The object of the invention is also achieved by mean of a method of milking a group of at least two animals in a milking arrangement according to the present invention, characterized in that said method comprises the steps of
- performing milking of animals standing in the milking places of the milking arrangement, wherein, during said milking, the front gate assembly is in its lower position and the entrance gate is in its closed position,
- deciding or detecting when the milking is finished and, as a response thereto:
- control the first drive device to move the front gate assembly from its lower position to its upper position,
- control the third drive device to move the sequence gate assembly from its second position to its first position thereby urging the milked animals to leave their milking places through the front side of the milking arrangement, and, when the sequence gate assembly has reached its first position, and
- control the second drive device to move the entrance gate from its closed position to its open position and thereby permitting further animals to be milked to enter the milking arrangement in a direction from the primary end to the secondary end through a path between the sequence gate assembly and the rear side of the milking arrangement.

According to one embodiment, before start of milking of animals that have entered the milking places or during milking of said animals, the method comprises the step of controlling the third drive device to move the sequence gate assembly from its first position to its second position. Preferably, the sequence gate is moved to the second position within a predetermined period of time from the moment at which milking of all the animals in the modules of the arrangement has started.

According to one embodiment, the method comprises the steps of detecting by means of a detector the fact that the sequence gate assembly has moved from its second position to its first position and providing information indicative of this fact to the control unit, and that, on order from the control unit, the entrance gate is moved from its closed to its open position as a response to the control unit having received said information.

According to one embodiment, the method comprises the steps of detecting when the sequence gate assembly has reached its first position and providing information to the control unit that it has been detected that the sequence gate assembly has reached its first position, wherein the control unit is configured to control the first drive device to move the front gate assembly from its upper position to its lower position as a response thereto. Thereby, it is made sure that a new group of animals entering the modules of the milking arrangement are not enabled to pass out of the milking arrangement through the front side before milking starts.

According to one embodiment, the method comprises the steps of detecting when all animals that are to be milked in the milking arrangement during a milking session have reached their milking places and to provide the control unit with information indicative to the fact that the animals have reached their milking places, wherein the control unit is configured to control the third drive device to move the sequence gate assembly from its first position to its second position as a response to having received said information.

According to one embodiment, the sequence gate assembly is moved from its lower position to its upper position within 60 seconds, preferably within 30 seconds, from the moment when it has been detected that the animals have reached their milking positions.

Further features and advantages of the present invention will be presented in the following detailed description of embodiments.

BRIEF DESCRIPTION OF THE DRAWINGS

Exemplifying embodiments of the present invention will now be described more in detail with reference to the annexed drawing, on which:

FIG. 4A discloses a perspective view of the milking module with an initially raised further gate assembly.

FIG. 4B discloses a side view of the milking module in FIG. 4A.

FIG. 6A discloses a perspective view of the milking module with the front gate assembly further raised to 50%, FIG. 6B discloses a side view of the milking module in FIG. 6A.

FIG. 8A discloses a perspective view of the milking module with the front gate assembly in an upper position, and a further gate assembly in an upper position.

FIG. 8B discloses a side view of the milking module in FIG. 8A.

FIG. 9A discloses a perspective view of the milking module with a further gate assembly in a lower position.

FIG. 9B discloses a side view of the milking module in FIG. 9A.

FIG. 11A discloses a perspective view of the milking module with the front gate assembly in an index position.

FIG. 11B discloses a side view of the milking module in FIG. 11A.

DETAILED DESCRIPTION

Figure 1:
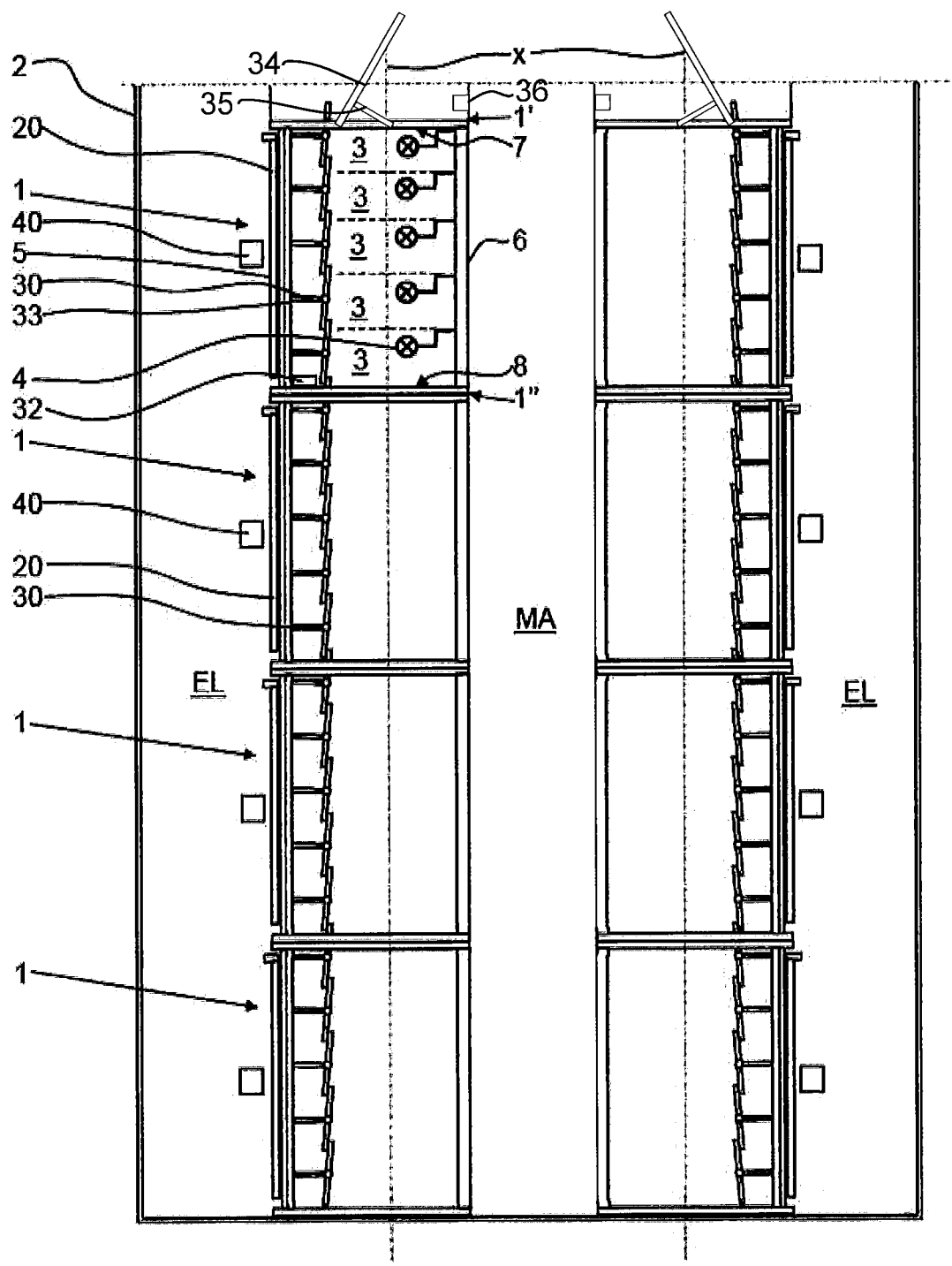
FIG. 1 is a schematic representation of a double row milking parlour comprising two parallel milking arrangements according to the invention, separated by an operator pit and seen from above, FIG. 2A discloses a perspective view of a milking module of the milking arrangement in a load position.

FIG. 1 disclose a double row milking parlour comprising two parallel milking arrangements according to the invention, separated by an operator pit. The milking arrangements are positioned with their rear sides towards each other. Each milking arrangement comprises a row of milking modules 1. In the embodiments disclosed, each row comprises four milking modules 1 which are arranged consecutively after each other along a respective longitudinal axis x. The milking arrangements are housed in a milking stall building 2. At a primary end 1' of each arrangement there is provided an entrance gate 34, which is movable between a closed position in which it prevents animals from entering the row of milking modules 1, and an open position in which it permits animals to enter the row of milking modules 1.

With reference to FIGS. 2A-11B, the milking modules 1 of one milking arrangement will now be explained more closely. Each milking module 1 comprises five milking places 3 arranged side by side after each other along the longitudinal axis x, see FIG. 1. Each milking place 3 is configured to receive a respective animal to be milked with the aid of any suitable milking equipment 4, schematically indicated in FIG. 1 in one of the milking modules 1.

Each row may comprise another number of milking modules 1 than four. The milking arrangement may comprise another number of rows than two.

Each milking module 1 comprises a primary end 1' and a secondary end 1" opposite to the primary end 1'. The milking module 1 extends along the longitudinal axis x from the primary end 1' to the secondary end 1", wherein the longitudinal axis x extends through the primary end 1' and the secondary end 1".

Each milking module 1 also comprises a front side 5 and a rear side 6 which both extend in parallel with the longitudinal axis x. The primary end 1' forms the entry into the milking module 1 for the animals to be milked. When entering the milking module 1 the animals will walk into the milking module 1 and turn so that their head is located at the front side 5 and their rear end at the rear side 6. The milking equipment 4 is located in the proximity of the rear side as can be seen in FIG. 1.

In the milking arrangement, see FIG. 1, the rear side 6 of each milking module 1 is facing a central milker area MA arranged in the above-mentioned pit, in which the milker may be present for attaching teat cups of the milking equipment 4 (also referred to as milking apparatus in this disclosure) to the teats of the animals. Outside the respective row of milking modules 1 an exit lane EL is provided to permit the animals to leave.

Figure 2A:
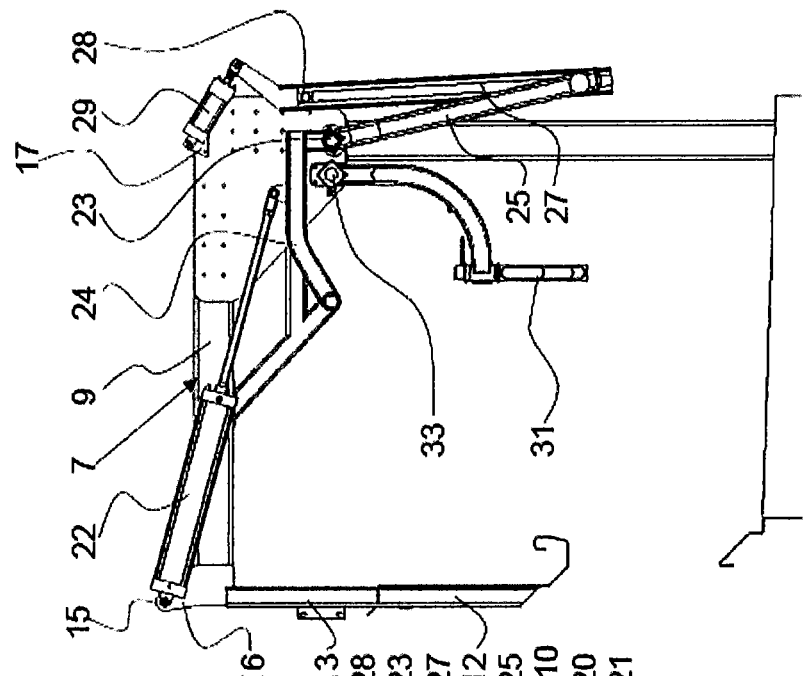
FIG. 2B discloses a side view of the milking module in FIG. 2A.
Figure 2B:
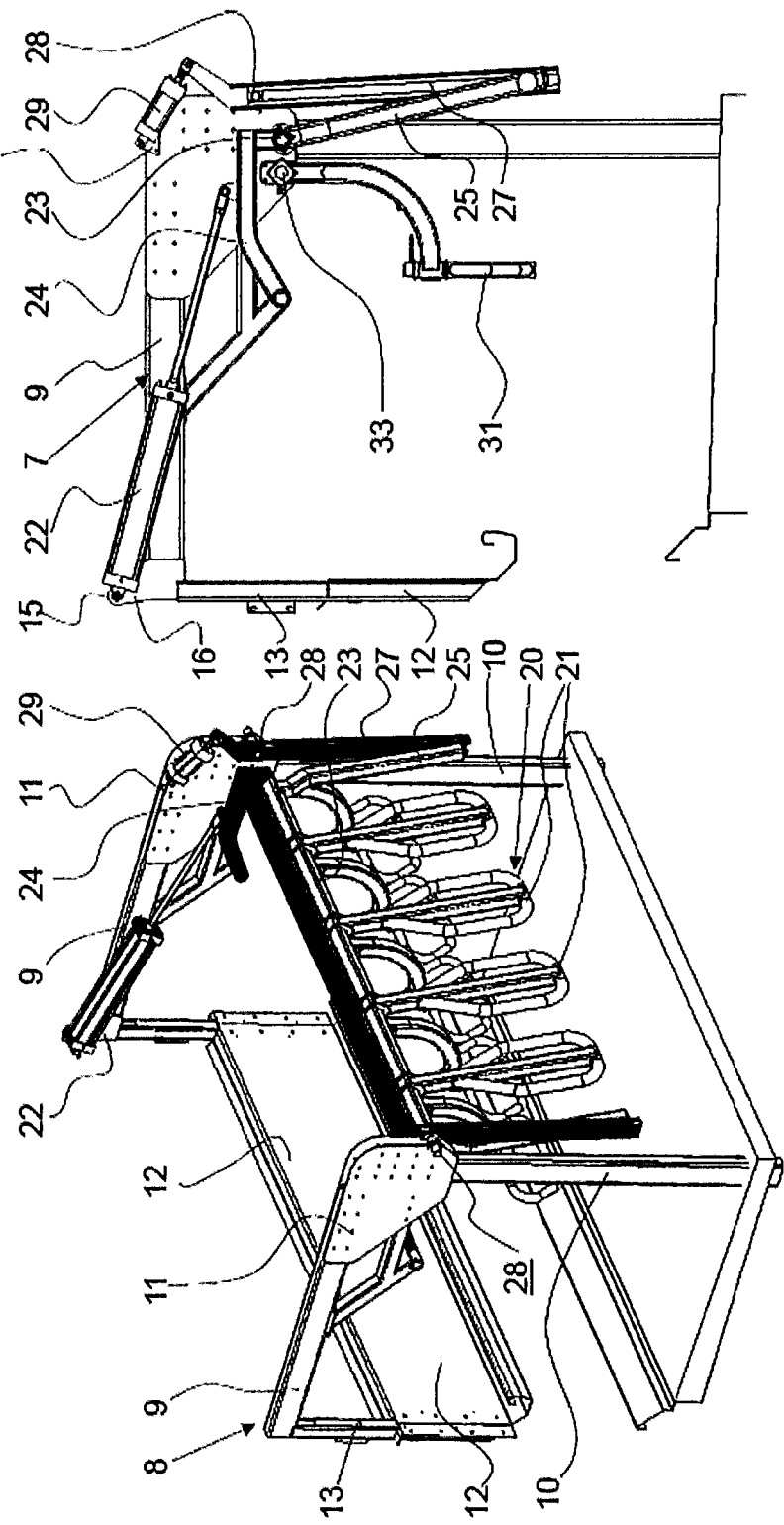

Each milking module 1 also comprises a stationary support structure comprising a primary structural element 7 defining the primary end 1' and a secondary structural element 8 defining the secondary end 1", see FIGS. 2A and 2B.

Each of the primary structural element 7 and the secondary structural element 8 comprises an upper elongated element 9. The upper elongated elements 9 extend transversally to the longitudinal axis x between the rear side 6 and the front side 5.

Each of the primary structural element 7 and the secondary structural element 8 also comprises a front post 10. The front posts 10 extend vertically at the front side 5. The front posts 10 support a respective one of the upper elongated elements 9. The upper elongated element 9 and the front post 10 are connected to each other by means of a corner member 11.

At the rear side 6, a rear shield 12 is provided. The rear shield 12 is suspended from the upper elongated elements 9 by two vertical bars 13, one from each of the upper elongated elements 9.

In the embodiments disclosed the primary structural element 7 defines an uppermost point 15 of the milking module 1, see FIGS. 2B and 8B. The uppermost point 15 is formed by a support plate 16 comprised by the primary structural element 7.

The support plate 16 may, as disclosed in FIGS. 2A and 8B, be attached to a rear end of the elongated element 9.

The primary structural element 7 also comprises a further support plate 17, which may be attached to the upper elongated element 9 at a front end thereof, see FIG. 2B.

The support plate 16 and/or the further support plate 17 may alternatively be attached to the secondary structural element 8.

The milking module 1 is attached to the ground as can be seen in FIGS. 2A-11B. The attachment of the milking module 1 is achieved by fixing the front posts 10 in the ground. The ground, or floor, is in the embodiments disclosed not a part of the milking module 1. However, it is possible to let the ground, possibly formed by a floor plate, be a part of the milking module 1.

The milking module 1, with or without a floor plate, may be installed in the milking stall building 2 as a prefabricated unit. The milking module 1 may thus be moved into the milking stall building 2 as a unit and arranged in its proper position.

Each milking module 1 also comprises a front gate assembly 20 and a sequence gate assembly 30.

The front gate assembly 20 is provided at the front side 5 and extends in parallel with the longitudinal axis x. The front gate assembly 20 is movable between a lower position, see FIGS. 2A and 2B, and an upper position, see FIGS. 8A, 8B, 9A and 9B. In the lower position, the front gate assembly 20 closes the front side 5 to prevent the animals from leaving the respective milking place 3 through the front side 5. In the upper position, the front gate assembly 20 permits the animals to leave the respective milking place 3 through the front side 5.

The sequence gate assembly 30 is movable between a lower, first position, see FIGS. 2A, 2B and 9A-11B, and an upper, second position, see FIGS. 3A-8B.

Both the front gate assembly 20 and the sequence gate assembly 30 are supported by the stationary support structure, and more precisely by the primary structural element 7 and the secondary structural element 8.

The sequence gate assembly 30 comprises a plurality, here five, sequence gates 31, which are openable from a closing position, see FIGS. 2A and 2B, in which they extend in parallel with the longitudinal axis x and form a barrier towards entering the milking places 3 to an opening position in which they extend transversally to a longitudinal axis x and give access to the respective milking place 3 and form side walls of the milking places 3. By means of spring loading, the sequence gates 31 are biased such that their normal position will be the closed position. However, they are easily pivoted to their open position by forces applied by the animals, and the animals will learn how to do that in order to reach their milking places.

The sequence gates 31 are brought to the opening position by the animals when they enter the respective milking place 3. The animals entering the milking module 1 will proceed as far as possible and then turn into the last free milking place 3 and thereby opening the respective sequence gate 31 in a manner known per se.

Figure 3B:
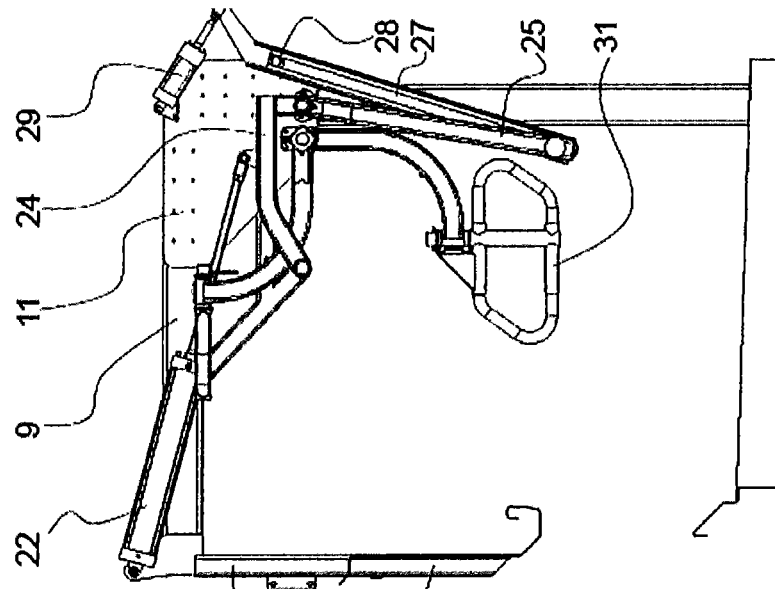
FIG. 3B discloses a side view of the milking module in FIG. 3A.
Figure 3A:
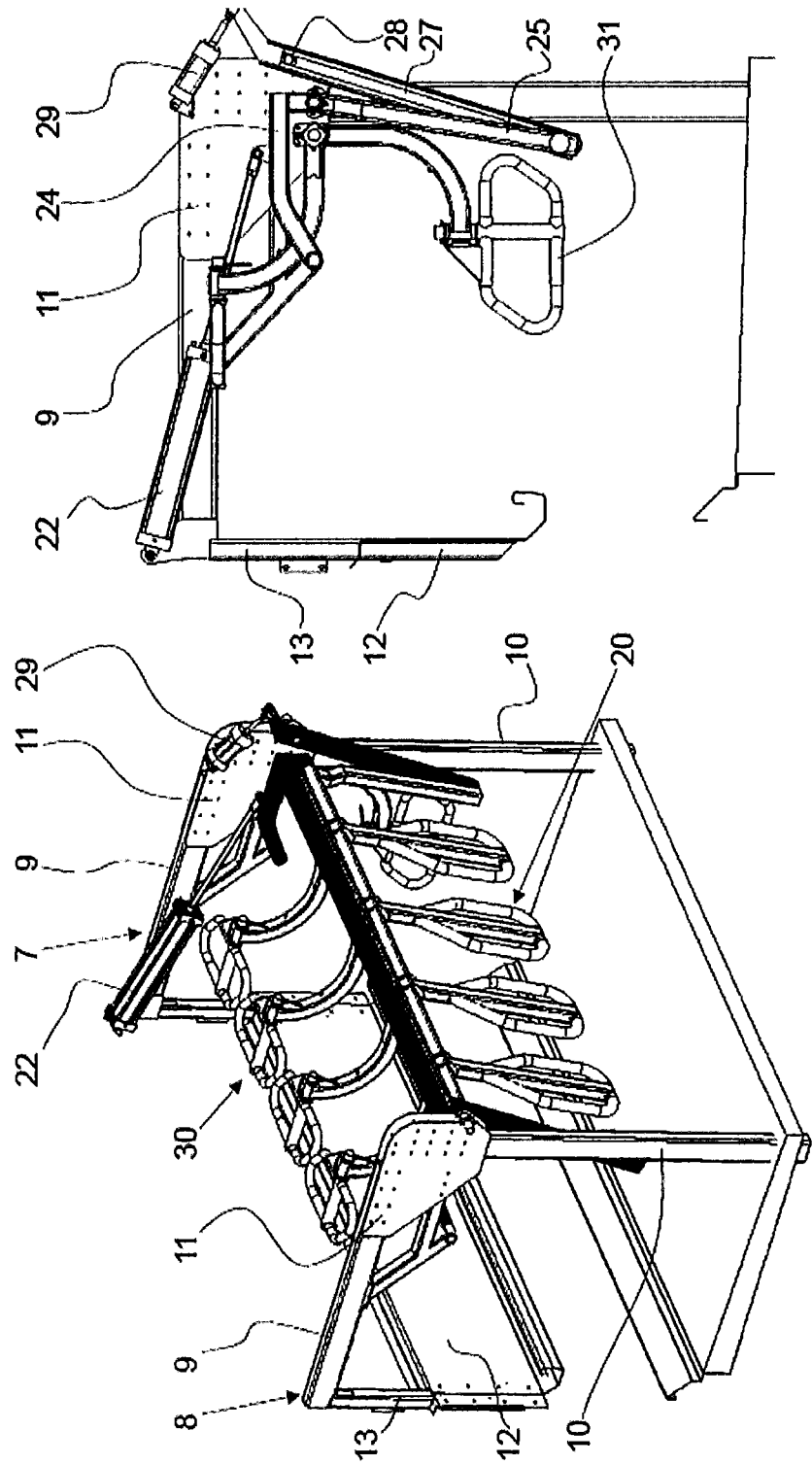
FIG. 3A discloses a perspective view of the milking module in a milking position.
Figures 5A, 5B:
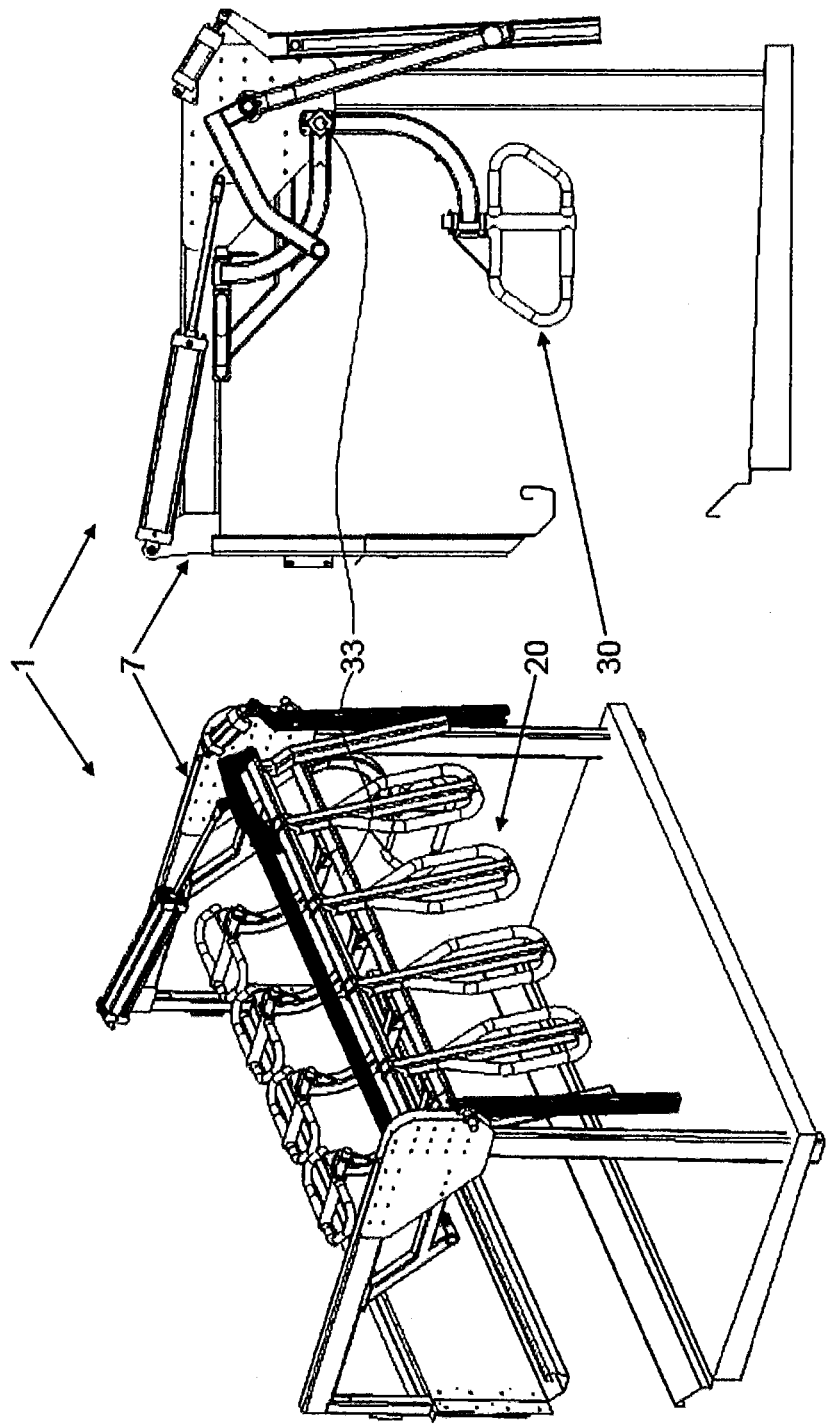
FIG. 5A discloses a perspective view of the milking module with the front gate assembly further raised 25%.
FIG. 5B discloses a side view of the milking module in FIG. 5A.
Figures 7A, 7B:
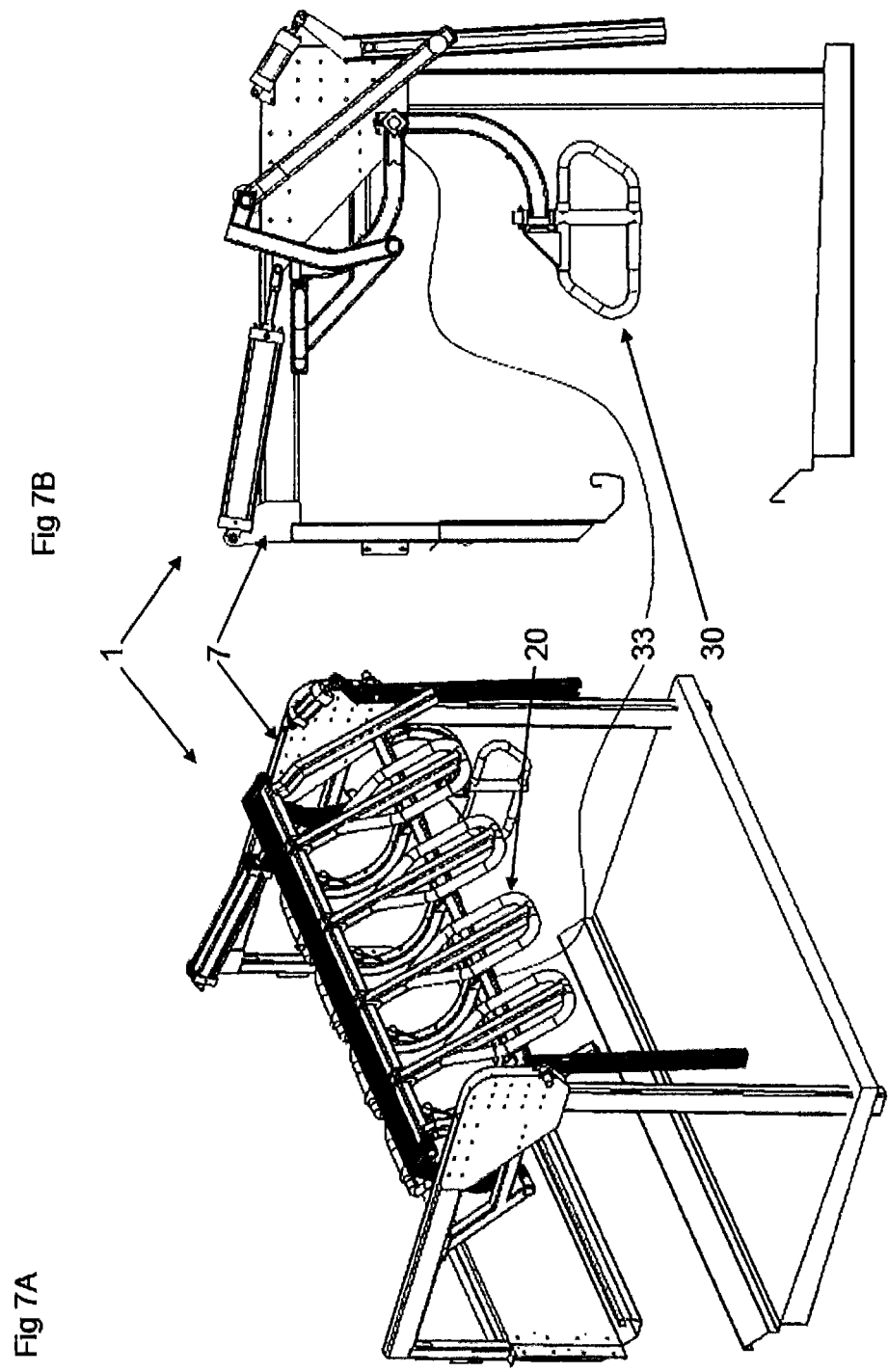
FIG. 7A discloses a perspective view of the milking module with the front gate assembly further raised to 75%.
FIG. 7B discloses a side view of the milking module in FIG. 7A.
Figures 10A, 10B:
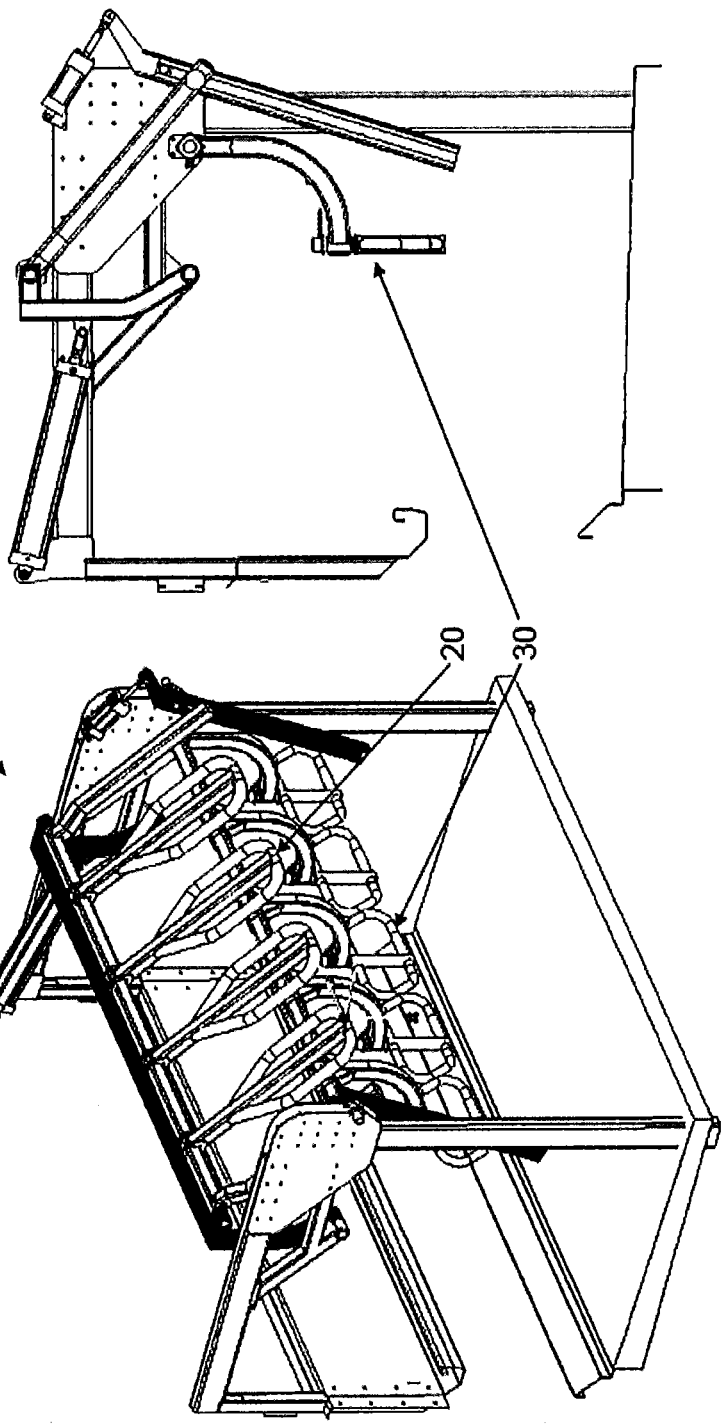
FIG. 10A discloses a perspective view of the milking module with the front gate assembly prepared for being lowered.
FIG. 10B discloses a side view of the milking module in FIG. 10A.

The sequence gates 31 are in the closing position when the sequence gate assembly 30 is in its upper position as can be seen in for instance FIGS. 3A and 3B. The sequence gate assembly 30 is moved from its lower position to its upper position as soon as possible after it has been detected that all animals that have entered the modules also have reached milking places and milking has started.

In the embodiments disclosed, only four of the five sequence gates 31 are movable from the lower position to the upper position and from the upper position to the lower position. The first sequence gate 31 being closest to the primary end 1', see FIGS. 3A and 3B, will remain in the lower position also when the four next sequence gates 31 are moved to the upper position. The first sequence gate 31 will thus function as a primary gate at the primary end 1' of the respective milking module 1, and form a kind of border between the milking modules 1 in the row of milking modules 1 in the milking arrangement during milking of the animals.

The sequence gate assembly 30 is supported by the primary structural element 7 and the secondary structural element 8 to be rotatable around an axis x' which is parallel to the longitudinal axis x, see FIG. 6A. As can be seen, in for instance FIGS. 6A and 6B, the sequence gate assembly 30 is rotatably supported by the corner members 11 of the primary structural element 7 and the secondary structural element 8.

The front gate assembly 20 comprises a front gate 21, forming a so-called neck rail and having four bottle-shaped elements. The front gate 21 of the front gate assembly 20 prevents the animals from passing the front gate 21 when the front gate assembly 20 is in the lower position, but permits, in this position, the animals to extend their heads through the front gate 21, in particularly between the bottle-shaped elements, for instance for eating feed provided in front of and outside the front gate assembly 20.

The front gate 21 is movable along a curved path when the front gate assembly 20 is moved between the lower position and the upper position. The front gate assembly 20 is also movable beyond the lower position in a direction towards the rear side 6 to an index position, see FIGS. 3A, 3B, 11A and 11B.

Each milking module 1 also comprises a drive arrangement for moving the front gate assembly 20 and the sequence gate assembly 30 between their lower and upper positions.

The drive arrangement is attached to the stationary support structure and located within the milking module 1 between the primary end 1' and the secondary end 1".

The drive arrangement comprises a first drive device 22 for moving the front gate assembly 20, see FIGS. 3A and 3B, a second drive device 35 for moving the entrance gate 34, and a third drive device 32 for moving the sequence gate assembly 30. Here, the first, second and third drive devices 22, 35, 32 are hydraulic or gas-driven cylinder-piston devices The milking arrangement comprises a control unit 40 communicating with the first drive device 22, the second drive device 35 and the third drive device 32 for controlling the first drive device 22, the second drive device 35 and the third drive device 32 independently of each other.

There may also be provided a user interface (not shown), which may consist of electric circuits and push buttons or the like by means of which an operator can control the operation of the respective drive devices, thereby intervening in an operation logic of the control unit. The user interface could, of course, also be any device connected to the control unit and interacting therewith.

The first drive device 22 is drives the front gate assembly 20. The second drive device 35 drives the entrance gate 34. The third drive device 32 drives the sequence gate assembly 30.

The third drive device 32 may be attached to the secondary structural element 8 as is schematically indicated in FIG. 1. It is of course also possible to attach the third drive device 32 to the primary structural element 7.

The front gate assembly 20 comprises a shaft 23 to which the front gate 21, with the four bottle shaped elements, is attached, see FIGS. 2A and 2B. The shaft 23 is rotatably held by two levers 24, one at the primary end 1' and one at the secondary end 1". The two levers 24 are rotatably held at a rear end of the levers 24 in the primary structural element 7 and the secondary structural element 8, respectively, by means of a respective joint.

The front gate assembly 20 also comprises two arms 25 both attached to the shaft 23. The arms 25 has at an outer end opposite to the shaft 23, a guide wheel which is slidingly arranged in a guide channel of a respective guide bar 27.

In the embodiments disclosed, the front gate assembly 20 comprises two arms 25 and two guide bars 27. However, it is possible to provide only one arm 25 and one guide bar 27.

The first drive device 22 comprises a cylinder and is connected to the lever 24 to move the lever 24 from a lower position, see FIG. 3B, in which the first drive device 22 is extended, to an upper position, see FIG. 8B, in which the first drive device 22 is retracted. When being moved from the lower position to the upper position, the lever 24 retracts the arm 25 so that it will slide from a lower point in the guide channel of the guide bar 27 to an upper point of the guide channel. This will permit the front gate assembly 20 to be moved from the lower position disclosed in FIGS. 4A, 4B to the upper position disclosed in FIGS. 8A, 8B along the curved path via the intermediate positions disclosed in FIGS. 5A-7B.

The front gate 21 has an inner end which is located at the shaft 23 and outer end. The front gate 21 is guided along the curved path by means of the guide bars 27 so that the outer end of the front gate 21 moves upwardly along the front side, i.e. substantially in parallel with the front side 5, as can be seen in FIGS. 4B, 5B, 6B, 7B and 8B. The inner end of the front gate 21 is simultaneously moved or pulled towards the rear side 6.

As mentioned above, the front gate assembly 20 is movable beyond the lower position to an index position shown in FIGS. 3A, 3B, 11A and 11B. This movement is obtained by means of the guide bars 27.

The guide bars 27 are attached to a respective one of the primary structural element 7 and the secondary structural element 8 by means of a respective joint 28. The joints 28 permit the guide bars 27 to rotate around the respective joint 28. The rotation of the guide bars 27 is provided by means of an index drive device 29 attached to the corner member 11 of the primary structural element 7 as can be seen in FIGS. 2A-3B. The index drive device 29 is connected to an extension of the guide bar 27 attached to the primary structural element 7. The index drive device 29 comprises a cylinder.

In FIGS. 2A and 2B, the index drive device 29 is retracted and the guide bar 27 are in a first position holding the front gate assembly 20 in its lower position. The first position is vertical, or substantially vertical.

In FIGS. 3A and 3B, the index drive device 29 is extended and has moved the guide bar 27 from the first position to a second position, thereby moving the front gate assembly 20 from the lower position to the index position.

As mentioned above, the sequence gate assembly 30 is movable by means of the third drive device 32. The sequence gate assembly 30 comprises a shaft 33 which is rotatable in relation to the primary structural element 7 and the secondary structural element 8, see FIGS. 4A-8B.

The first sequence gate 31 of the sequence gate assembly 30 is fixedly attached to the primary structural element 7. The four next sequence gates 31 are fixedly attached to the shaft 33 to be rotatable between the lower position and the upper position of the sequence gate assembly 30 and the four sequence gates 31. The third drive device 32 is connected to the shaft 33 to provide said rotation of the sequence gate assembly 30.

The front gate assembly 20 and the sequence gate assembly 30 will always be positioned below the uppermost point. In FIGS. 8A and 8B, the front gate assembly 20 and the sequence gate assembly 30 are shown in their upper positions, and it can be seen that they do not exceed the uppermost point 15 and are located below the ceiling 50 of the milking stall building 2. The distance h between the ground of the milking stall building 2 and the ceiling 50 is less than 3.5 m, preferably less than 3 m, more preferably less than 2.5 m. The uppermost point 15 may thus be located at a small distance d from the ceiling 50, see FIG. 8B.

As can also be seen in FIG. 8B, the inner end of the front gate 21 is located above and overlaps the sequence gates 31, when the front gate assembly 20 and the sequence gate assembly 30 are in their upper positions in the vicinity of each other, so that the animals may pass beneath the sequence gates 31 and the front gate 21, while the sequence gates 31 and the front gate 21 remain beneath the uppermost point 15.

The milking arrangement, and the individual milking modules 1 are primarily operated through the control of the control unit 40, if necessary with intervention by an operator via a user interface as mentioned earlier. The control unit 40 is provided with software that controls the operation of the respective drive devices.

One control scenario is as follows: On basis of information from milk meters connected to the milking equipment, thus working as a detector telling the control unit 40 that the milking is finished, the control unit 40 controls the first drive device 22 to move the front gate assembly 20 from its lower position to its upper position. Once the front gate assembly reaches its upper position, the control unit 40 controls the third drive device 32 to move the sequence gate assembly 30 from its second, upper position to its first lower, first position. The sequence gates 31 will be in their closed position as a result of the biasing thereof, and will function as a wall that urges the animals out of their milking places 3 through the front side 5. A detector or sensor (not shown) configured to detect when the sequence gate assembly reaches its first position, will provide the control unit 40 with information that the sequence gate assembly has reached its first position. As an immediate response thereto the control unit 40 controls the first drive device 22 to move the front gate assembly from its upper position to its lower position, and controls the second drive device 35 to open the entrance gate 34 to permit another group of animals to enter the modules 1. Preferably there is provided a detector, here indicated with 36, that counts the number of animals entering the modules 1 and that provides the control unit with information indicative to the fact that a predetermined maximum number of animals have entered the modules 1, whereby the control unit 40 is configured control the second drive device 35 to close the entrance gate 34.

As the new group of animals to be milked enter the modules 1, the sequence gates 31 are in the closing positions. The first animal entering the milking modules 1 will continue to the last milking place 3 of the last milking module 1, and there turn into the milking place 3, thereby opening the respective sequence gate 31. The following animals will then sequentially enter the milking places 3 until all milking modules 1 have been filled by the animals.

As soon as one milking module 1 is complete, the front gate assembly 20 is moved to the index position disclosed in FIGS. 3A and 3B by activation of the index drive device 29 through the control unit 40. The teat cups of the milking equipment 4 are then attached to the teats of the animals, whereafter the milking is started.

The sequence gate assembly 30 is then moved to its upper position, see FIGS. 3A and 3B, by activation of the third drive device 32 through the control unit 40, wherein the four last sequence gates 31 are lifted to the upper position and the first sequence gate 31 remains in its lower position. Preferably, there is provided a detector that detects when milking has started for all the animals within a module and which provides the control unit with information indicative to this fact, whereby the control unit 40 is configured to control the third drive device 32 to move the sequence gate assembly 30 to its upper, second position as a response thereto.

When the milking has been finished and the teat cups are removed from the teats of the animals in one milking module 1, the front gate assembly 20 is moved from the index position to the lower position as disclosed in FIGS. 4A and 4B, by activation of the index drive device 29 through the control unit 40. As previously mentioned, a milk meter could be used for detecting that the milking has been finished. As an alternative, the detector could be a detector that detects when the teat cups are removed, which is also indicative to the fact that the milking has been finished.

The front gate assembly 20 is then moved from the lower position disclosed in FIGS. 4A and 4B to the upper position disclosed in FIGS. 8A and 8B along the curved path via the intermediate positions disclosed in FIGS. 5A-7B by activation of the first drive device 22 through the control unit 40. During the movement of the front gate assembly 20 to its upper position, the sequence gate assembly 30 remains in the upper, second position.

Then, or when the animals have started to walk out of the milking module through the front side 5, the sequence gate assembly 30 is moved from the upper position disclosed in FIGS. 8A-8B to the lower position disclosed in FIGS. 9A and 9B, by activation of the third drive device 32 through the control unit 40. The sequence gate assembly 30 will then push animals, which have not yet left their respective milking place 3, forward out through the milking module 1 through the front side 5. As mentioned earlier, a detector for detecting when the sequence gate assembly 30 has reached its first position provides the control unit 40 with information indicative of this fact, whereupon the control unit 40 once again opens the entrance gate 34 for the entrance of another group of animals.

The animals that have left the modules 1 through the front side 5 may then leave the milking arrangement via the exit lanes EL. The guide bars 27 are then moved to the index position, see FIGS. 10A and 10B and the front gate assembly is then moved from the upper position directly to the index position as disclosed in FIGS. 11A and 11B.

The present invention is not limited to the embodiments disclosed but may be varied and modified within the scope of the following claims

The invention claimed is:
1. A milking arrangement comprising:
at least one milking module comprising at least two milking places arranged side by side after each other along a longitudinal axis, each milking place being configured to receive a respective animal to be milked, a primary end and a secondary end opposite to the primary end, wherein the milking arrangement extends along the longitudinal axis from the primary end to the secondary end, a front side and a rear side, the front side and the rear side both extending in parallel with the longitudinal axis, a front gate assembly located at the front side and movable between i) a lower position in which the front gate assembly closes the front side to prevent the animals from leaving the respective milking place through the front side, and ii) an upper position, configured to permit the animals to leave the respective milking place through the front side, a sequence gate assembly comprising at least two sequence gates provided between said front side and said rear side, wherein each of said at least two sequence gates, in a first positon of the sequence gate assembly, is pivotable between a closed position, in which each sequence gate defines a barrier against entrance into one of the at least two milking places, and an open position in which each sequence gate forms a side wall of the one milking place, and an entrance gate provided in the primary end of the milking module, said entrance gate being movable between a closed position in which the entrance gate prevents animals from entering said at least one milking module and an open position in which the entrance gate allows animals to enter the milking module through the primary end;

an independent first drive device for moving the front gate assembly between the lower and upper positions;

a second drive device for moving the entrance gate between the open and closed positions;

an independent third drive device for moving the sequence gate assembly from said first position to a second position, which second position is an elevated position in which the at least two sequence gates are located at a level above and behind the animals standing in the respective milking places, wherein the sequence gate assembly is configured to move from said second position to the first position with the at least two sequence gates in their closed position such that the at least two sequence gates urge the animals standing in their respective milking places to move towards the front side and to leave the milking places through the front side; and a control arrangement which is configured to control the opening of the entrance gate on basis of the position of the sequence gate assembly.

2. The milking arrangement according to claim 1, wherein said control arrangement comprises a control unit which is configured to control operation of the entrance gate, the front gate assembly and the sequence gate assembly by controlling the operation of the first, second and third drive devices.

3. The milking arrangement according to claim 1, further comprising a user interface by means of which a user controls operation of at least one of the first, second and third drive devices.

4. The milking arrangement according to claim 2, further comprising a detector configured to provide the control unit with information indicative that the animals have reached their respective milking place and wherein the control unit is configured to control the third drive device to move the sequence gate assembly from the first position to the second position after receiving said information from said detector.

5. The milking arrangement according to claim 2, further comprising a detector configured to provide the control unit with information indicative that the milking of the animals has been finished, wherein the control unit is configured to control the first drive device to move the front gate assembly from the lower position to the upper position and to control the third drive device to move the sequence gate assembly from the second position to the first position after receiving said information from said detector.

6. The milking arrangement according to claim 2, further comprising a detector configured to provide the control unit with information indicative that the animals have entered said module, wherein the control unit is configured to control the second drive device to move the entrance gate from the open position to the closed position after receiving said information from said detector.

7. The milking arrangement according to claim 1, wherein the control unit is configured to control the second drive device to move the entrance gate from the closed position to the open position as a response to the sequence gate assembly having been moved from the second position to the first position.

8. A double row milking parlour, comprising two milking arrangements according to claim 1, the two milking arrangements being separated by an operator pit and positioned with their rear sides towards said pit.

9. A method of milking a group of at least two animals in a milking arrangement that comprises at least one milking module comprising:

at least two milking places arranged side by side after each other along a longitudinal axis, each milking place being configured to receive a respective animal to be milked, a primary end and a secondary end opposite to the primary end, wherein the milking arrangement extends along the longitudinal axis from the primary end to the secondary end, a front side and a rear side, the front side and the rear side both extending in parallel with the longitudinal axis, a front gate assembly located at the front side and movable between i) a lower position in which the front gate assembly closes the front side to prevent the animals from leaving the respective milking place through the front side, and ii) an upper position, configured to permit the animals to leave the respective milking place through the front side, a sequence gate assembly comprising at least two sequence gates provided between said front side and said rear side, wherein each of said at least two sequence gates, in a first positon of the sequence gate assembly, is pivotable between a closed position, in which each sequence gate defines a barrier against entrance into one of the at least two milking places, and an open position in which each sequence gate forms a side wall of the one milking place, and an entrance gate provided in the primary end of the milking module, said entrance gate being movable between a closed position in which the entrance gate prevents animals from entering said at least one milking module and an open position in which the entrance gate allows animals to enter the milking module through the primary end;

an independent first drive device for moving the front gate assembly between the lower and upper positions;

a second drive device for moving the entrance gate between the open and closed positions;

an independent third drive device for moving the sequence gate assembly from said first position to a second position, which second position is an elevated position in which the at least two sequence gates are located at a level above and behind the animals standing in the respective milking places, wherein the sequence gate assembly is configured to move from said second position to the first position with the at least two sequence gates in their closed position such that the at least two sequence gates urge the animals standing in their respective milking places to move towards the front side and to leave the milking places through the front side; and a control arrangement which is configured to control the opening of the entrance gate on basis of the position of the sequence gate assembly, said method comprising steps of:

performing milking of the animals standing in the milking places of the milking arrangement, wherein, during said milking, the front gate assembly is in the lower position and the entrance gate is in the closed position, deciding or detecting when the milking is finished and, as a response thereto:

control the first drive device to move the front gate assembly from the lower position to the upper position, control the third drive device to move the sequence gate assembly from the second position to the first position thereby urging the milked animals to leave their milking places through the front side of the milking arrangement, and, when the sequence gate assembly has reached the first position, control the second drive device to move the entrance gate from the closed position to the open position and thereby permitting further animals to be milked to enter the milking arrangement in a direction from the primary end to the secondary end through a path between the sequence gate assembly and the rear side of the milking arrangement.

10. The method according to claim 9, wherein, before milking of animals that have entered the milking places or during milking of said animals, a further step of controlling the third drive device to move the sequence gate assembly from the first position to the second position.

11. The method according to claim 9, comprising further steps of detecting by means of a detector a fact that the sequence gate assembly has moved from the second position to the first position and providing information indicative of the fact to the control unit, wherein, on order from the control unit, the entrance gate is moved from the closed to the open position as a response to the control unit having received said information.

12. The method according to claim 9, comprising further steps of detecting when the sequence gate assembly has reached the first position and providing information to the control unit of detecting that the sequence gate assembly has reached the first position, wherein the control unit is configured to control the first drive device to move the front gate assembly from the upper position to the lower position as a response thereto.

13. The method according to claim 9, comprising further steps of detecting when all animals that are to be milked in the milking arrangement during a milking session have reached their milking places and to provide the control unit with information indicative that the animals have reached their milking places, wherein the control unit is configured to control the third drive device to move the sequence gate assembly from the first position to the second position as a response to having received said information.

14. The method according to claim 13, wherein the sequence gate assembly is moved from the lower position to the upper position within 60 seconds from the moment of detecting that the animals have reached their milking positions.

15. The method according to claim 13, wherein the sequence gate assembly is moved from the lower position to the upper position within 30 seconds from the moment of detecting that the animals have reached their milking positions.

16. The milking arrangement according to claim 2, further comprising:

a first detector configured to provide the control unit with information indicative that the animals have reached their respective milking place, wherein the control unit is configured to control the third drive device to move the sequence gate assembly from the first position to the second position after receiving said information from said detector;

a second detector configured to provide the control unit with information indicative that the milking of the animals has been finished, wherein the control unit is configured to control the first drive device to move the front gate assembly from the lower position to the upper position and to control the third drive device to move the sequence gate assembly from the second position to the first position after receiving said information from said detector; and a third detector configured to provide the control unit with information indicative that the animals have entered said module, and wherein the control unit is configured to control the second drive device to move the entrance gate from the open position to the closed position after receiving said information from said detector.

17. The milking arrangement according to claim 16, wherein the control unit is configured to control the second drive device to move the entrance gate from the closed position to the open position as a response to the sequence gate assembly having been moved from the second position to the first position.

* * * * *